(No Model.)
W. W. REBUSCHATIS & J. F. COLLINS.
PRINTER'S GALLEY.
No. 541,882. Patented July 2, 1895.
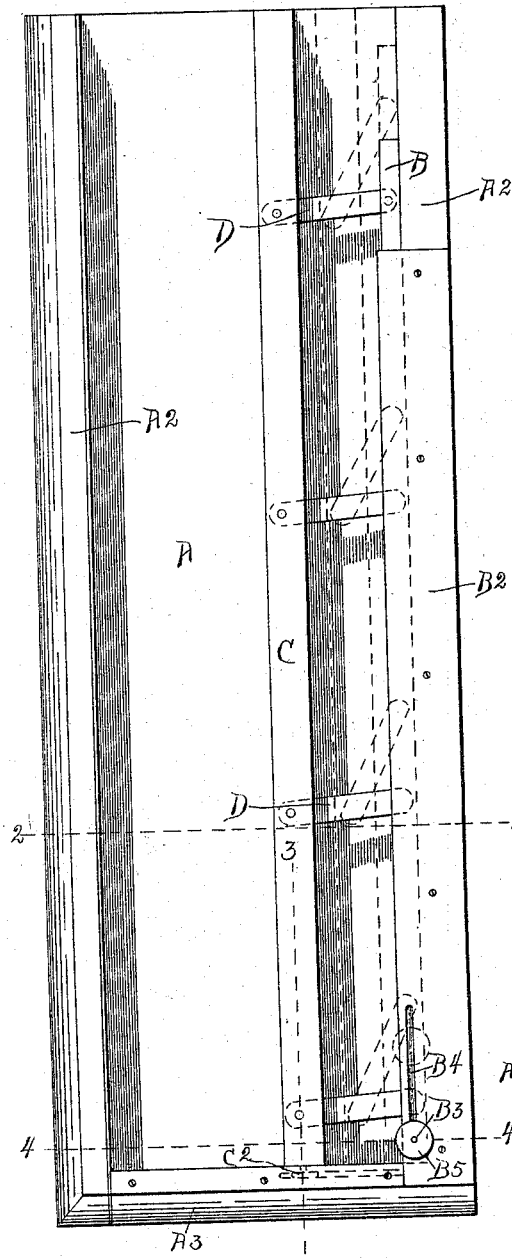
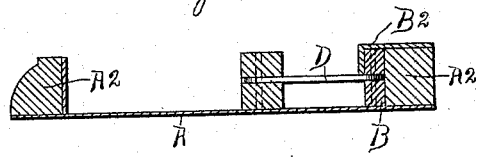
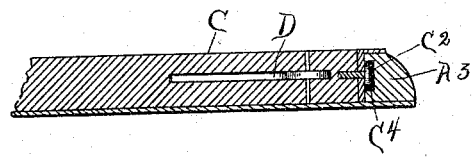
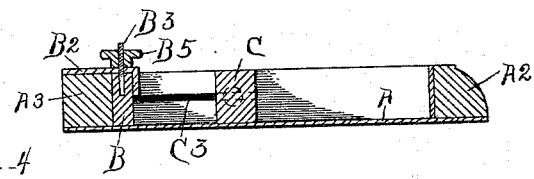

UNITED STATES PATENT OFFICE.

WILLIAM W. REBUSCHATIS AND JOHN F. COLLINS, OF DES MOINES, IOWA.

PRINTER'S GALLEY.

SPECIFICATION forming part of Letters Patent No. 541,882, dated July 2, 1895.

Application filed December 31, 1894. Serial No. 633,461. (No model.)

*To all whom it may concern:*

Be it known that we, WILLIAM W. REBUSCHATIS and JOHN F. COLLINS, citizens of the United States of America, residing at Des Moines, in the county of Polk and State of Iowa, have invented a new and useful Printer's Galley, of which the following is a specification.

The object of this invention is to produce a simple, strong, and durable galley having a side stick permanently connected therewith and provided with means whereby it may be adjusted laterally and firmly clamped in any position so as to be readily adjustable to various sized columns.

Our invention consists in certain details in the construction, arrangement and combination of the side stick and operating mechanism therefor with the galley as hereinafter set forth, pointed out in our claim and illustrated in the accompanying drawings, in which—

Figure 1 is a top plan view of the complete device; Fig. 2, a transverse sectional view through the line 2 2 of Fig. 1. Fig. 3 is a longitudinal sectional view showing the connection of the side stick with the head of the galley, taken through the line 3 3 of Fig. 1; and Fig. 4 is a transverse sectional view through the line 4 4 of Fig. 1.

Referring to the accompanying drawings, the reference letter A is used to indicate a sheet brass galley of the usual form having the wooden side pieces $A^2$ and end piece $A^3$.

B indicates a bar slidingly connected with the right hand side piece by having a sheet metal guide $B^2$ fixed to said side piece and overlapping the side of said bar, thus permitting the bar to slide freely longitudinally.

$B^3$ is a screw threaded rod projected upwardly from bar B through a slot $B^4$ formed in said guide $B^2$ and $B^5$ is a thumb nut on its upper end. By this arrangement the bar may be conveniently moved by grasping the nut and readily and quickly clamped in any position by turning the nut.

C indicates the side stick having a straight smooth inner surface and of the same length and height as the side pieces of the frame. Its end is slidingly connected with the head of the galley by having a screw $C^2$ inserted in the end of the side stick passed through a slot $C^3$ formed in the brass lining of the end piece and having its head $C^4$ in a recess formed in the end piece. This it will be seen will allow the side stick to be moved laterally on the frame but not longitudinally.

D indicates a series of flat levers with their ends inserted in slots in the juxtaposed faces of the side stick and sliding bar and pivotally connected therewith at their ends. When the side stick is extended to its limit inwardly and the said bar is drawn toward the head of the galley said levers will be at right angles thereto and it will be obvious that when the bar is moved longitudinally away from the head, the side stick will be drawn straight across the galley.

It will be seen that when the column of type is of such a size that the side stick will engage it when the levers D are almost at right angles thereto a slight additional movement thereof will bring the levers past a dead center and thus securely lock the same in position without adjusting the set screw and when the column of type is larger, the side stick may be securely held by means of the set screw. It will be seen further that by the use of this side stick the danger of accidentally pieing type in the galley will be greatly lessened inasmuch as the side stick cannot be forced upwardly or moved longitudinally of the galley.

Having thus described our invention, what we claim as new therein, and desire to secure by Letters Patent of the United States therefor, is—

An improved printer's galley, comprising a suitable galley a bar extended parallel with one side thereof, a sheet metal guide fixed to the side of the galley to overlap the said bar and having the slot in its top above the bar, a screw-threaded rod fixed in said bar and projected upwardly through said slot, a thumb nut in its top, a side stick extended parallel with the sides of the galley and slidingly connected with the head of the galley, and a series of levers pivoted to the bar and side stick, substantially as and for the purposes stated.

WILLIAM W. REBUSCHATIS.
JOHN F. COLLINS.

Witnesses:
J. RALPH ORWIG,
THOMAS G. ORWIG.